(12) United States Patent
Hill et al.

(10) Patent No.: US 7,797,003 B2
(45) Date of Patent: Sep. 14, 2010

(54) TELECOMMUNICATION SERVICES APPARATUS AND METHODS FOR ADDRESSING THE PROBLEM OF MOBILE TERMINATED MESSAGE FAKING

(75) Inventors: Tony Francis Hill, Hampshire (GB); Jeffrey Wilson, Hampshire (GB)

(73) Assignee: Solent Text Limited, Hampshire (GB)

( * ) Notice: Subject to any disclaimer, the term of this patent is extended or adjusted under 35 U.S.C. 154(b) by 614 days.

(21) Appl. No.: 10/598,968

(22) PCT Filed: Mar. 18, 2005

(86) PCT No.: PCT/GB2005/001045
§ 371 (c)(1), (2), (4) Date: Aug. 15, 2007

(87) PCT Pub. No.: WO2005/091656
PCT Pub. Date: Sep. 29, 2005

(65) Prior Publication Data
US 2008/0004047 A1    Jan. 3, 2008

(30) Foreign Application Priority Data
Mar. 18, 2004   (GB) ................................ 0406119.8

(51) Int. Cl.
*H04Q 7/20* (2006.01)
(52) U.S. Cl. ................. 455/466; 455/414.1; 455/412.1; 455/432.1
(58) Field of Classification Search ................. 455/466, 455/414.1
See application file for complete search history.

(56) References Cited
U.S. PATENT DOCUMENTS
2002/0159387 A1*   10/2002   Allison et al. ............... 370/229
(Continued)

FOREIGN PATENT DOCUMENTS
GB         2 397 139         9/2006
WO         01/22752          3/2001
WO         01/53965          7/2001
WO         2004/019634       3/2004

OTHER PUBLICATIONS

"Digital cellular telecommunications system (Phase 2+); Technical realization of the Short Message Service (SMS) Point-to Point (PP) (3GPP TS 03.40 version 7.5.0 Release 1998); ETSI TS 100 901." ETSI Standards, European Telecommunications Standard Institute. vol. 3-T2; SMG4, No. V750 (Dec. 2001).

*Primary Examiner* — Lester Kincaid
*Assistant Examiner* — Charles Shedrick
(74) *Attorney, Agent, or Firm* — Renner, Otto, Boisselle & Sklar, LLP

(57) ABSTRACT

A telecommunications services apparatus, in a mobile telecommunications network, comprises means (2) for receiving a MAP Send Routing Information for Short Message (SRI_SM message) originating from another network and operate to forward the SRI_SM message to a home location register (4), means for receiving a response from the home location register (4) to the SRI_SM message, means for temporarily storing information relating to the SRI_SM response and operable to pass said response on to a network address identified as the originating address, and means for receiving a MAP Mobile Terminated Forward Short Message (MT_Fwd_SM message) from the other network and operable to correlate the MT_Fwd_SM message with a previously-sent SRI_SM response using stored information. The apparatus is operable to detect and selectively reject MT_Fwd_SM messages for which there is at least insufficient correlation between the MT_Fwd_SM message and the previously-sent SRI_SM response, and to pass other MT_Fwd_SM messages on to their respective destinations. The apparatus may include means for modifying IMSI information in the SRI_SM response, which may be operable to store information relating to the modified SRI_SM response and operable to pass the modified response on to the originating address network. In that case, the correlation determination may be made between the MT_Fwd_SM message and a previously-sent modified SRI_SM response.

20 Claims, 3 Drawing Sheets

U.S. PATENT DOCUMENTS

2004/0030906 A1 2/2004 Marmigere et al.
2005/0101306 A1* 5/2005 Zabawskyj et al. ....... 455/414.1
2006/0135133 A1* 6/2006 Cai et al. ................. 455/414.1
2006/0148495 A1* 7/2006 Wilson ...................... 455/466

* cited by examiner

TELECOMMUNICATION SERVICES APPARATUS AND METHODS FOR ADDRESSING THE PROBLEM OF MOBILE TERMINATED MESSAGE FAKING

This application is a national phase of International Application No. PCT/GB2005/001045 filed Mar. 18, 2005 and published in the English language.

This invention relates to telecommunications services apparatus and methods for use with a mobile telecommunications network, such as a mobile telephone system, and which may be applicable to the field of mobile messaging.

There are several types of unwanted messaging which currently take place in mobile telephone networks. In this context, messaging is taken to include all forms of text messaging such as SMS, MMS, EMS and the like, although the problem of unwanted or unsolicited mobile messages predominantly affects SMS messaging. These types of unwanted messaging can typically be categorised as—

Spam
Flooding
MT Faking
MO Spoofing

Spam refers to any type of unsolicited message. These messages frequently incite the recipient to call or text a premium rate number on the pretext that they have won a prize, and the messages are typically generated from countries and operators that do not have interconnect charging agreements with the receiving network.

Whilst Spam is typically targeted at valid destination numbers, flooding may use either valid or invalid address information. Flooding messages may be Spam or may constitute a denial of service attack on a network by consuming SS7 resources.

MT (mobile terminated) Faking refers to a technique whereby messages originating on another network's short message service centre (SMSC) or other device are directed at a target network's customers. However in this case, the source address details in the MT messages are faked to make it appear as though the message has originated from a different network. This can make it very difficult for the target operator to identify the true source of the MT messages, which usually comprise some form of Spam. Alternative MT faking scenarios may involve the destination IMSIs being selected randomly or cyclically or taken from a cached list in addition to, or instead of, the SMSC address being faked. All three of the problems so far described are different aspects of the same MT Spam issue. A significant aspect of faked SMSC source addresses is that another operator may get charged for the deliveries or even disconnected.

In contrast, MO (mobile originated) spoofing describes the scenario where mobile originated messages are directed to an operator's SMSC. In this case, the originator is made to look like one of the receiving operator's own customers so that the SMSC will accept the message. The spoofed originator is then charged for the message even though he did not originate it. Again by spoofing not only the MSISDN CLI but also the mobile switching centre (MSC) source address, it can be very difficult for operators to track down the source of these spoofed messages.

The present invention addresses the problem of MT faking, which is becoming a very significant issue for operators. MT faking is commonly used as a vehicle for flooding and Spam while allowing the perpetrators to remain anonymous. The MT messages attract a termination charge. Consequently the operator whose SMSC address has been faked into the MT message is charged for messages that he did not send. MT faking is therefore a significant problem for operators but has, up until now, been very hard to control.

Solutions involving content monitoring have been proposed. For example UK Patent Application GB-A-2 397 139 proposes an adaptive solution which monitors message content in an intelligent fashion and can detect likely occurrences of Spam. However, solutions that involve content monitoring can have regulatory problems and, in any case, only provide detection after an indicative level of messaging has already happened.

There are essentially four types of MT Spam—
1. Transactions with
   Genuine SRI_SM addresses, i.e. both SMSC address and destination MSISDN are genuine, and
   Genuine MT_fwd_SM addresses, i.e. both SMSC address and IMSI are genuine.
   This type of Spam can be stopped by commercial means because the source operator can easily be identified by the SMSC address. Operators or service providers that persist in sending unacceptable levels of this type of Spam can be cut off by the receiving operator.
2. Transactions with
   Genuine SRI_SM addresses, but
   False MT_fwd_SM addresses, e.g. faked SMSC address (different operator) and cached or randomly selected IMSI (which may or may not be a real or existing IMSI).
3. Transactions with
   False SRI_SM addresses, and
   False MT_fwd_SM addresses. In this case, the SMSC address may be the same in both messages but still be faked. This type of transaction would not be trapped by any protection mechanism that merely checked for expected pairings of SRI_SM and MT_Fwd_SM.
4. Transactions with
   No SRI_SM message at all,
   False MT_fwd_SM addresses. In this case, the SMSC address is faked, and the IMSI and VLR address are drawn from cached lists, or selected by other means.

Whilst Case 1 above can be dealt with by commercial means, cases 2, 3 and 4 cannot since the source operator is not easily identified. Cases 2, 3 and 4 therefore require a technical solution since the real source network address is hidden. Embodiments of the present invention provide a solution for cases 2, 3 and 4.

According to one aspect of the invention there is provided a telecommunications services apparatus for use with a mobile telecommunications network, the apparatus comprising means for receiving a MAP Send Routing Information for Short Message (SRI_SM message) originating from another network and operable to forward the SRI_SM message to a home location register, means for receiving a response from the home location register to the SRI_SM message, means for temporarily storing information relating to the SRI_SM response and operable to pass said response on to a network address identified as the originating address, means for receiving a MAP Mobile Terminated Forward Short Message (MT_Fwd_SM message) from said another network and operable to correlate the MT_Fwd_SM message with a previously-sent SRI_SM response using stored information, the apparatus being operable to detect and selectively reject MT_Fwd_SM messages for which there is at least insufficient correlation between the MT_Fwd_SM message and the previously-sent SRI_SM response, and to pass other MT_Fwd_SM messages on to their respective destinations.

According to another aspect of the invention there is provided a telecommunications services method for use with a mobile telecommunications network, the method comprising receiving a MAP Send Routing Information for Short Message (SRI_SM message) originating from another network and forwarding the SRI_SM message to a home location register, receiving a response from the home location register to the SRI_SM message, temporarily storing information relating to the SRI_SM response and passing said response on to a network address identified as the originating address, receiving a MAP Mobile Terminated Forward Short Message (MT_Fwd_SM message) from said another network and correlating the MT_Fwd_SM message with a previously-sent SRI_SM response using stored information, detecting and selectively rejecting MT_Fwd_SM messages for which there is at least insufficient correlation between the MT_Fwd_SM message and the previously-sent SRI_SM response, and passing other MT_Fwd_SM messages on to their respective destinations.

Other aspects of the invention provide a computer program for implementing a method as set out above, and a storage medium storing the computer program.

According to a further aspect of the invention there is provided a telecommunications services apparatus for use with a mobile telecommunications network, the apparatus comprising means to receive a MAP Send Routing Information for Short Message (SRI_SM message) from another network and to forward the said SRI_SM message to an HLR, means to receive the HLR's response to said SRI_SM message, means to temporarily store information relating to said SRI_SM response, and to pass said response on to the originating network. The apparatus further comprises means to receive a MAP Mobile Terminated Forward Short Message (MT_Fwd_SM message) from said another network and to correlate this message with stored information relating to a previous sent SRI_SM response. The apparatus is operable to reject MT_Fwd_SM messages for which there is no correlation between the MT_Fwd_SM message and a previously sent SRI_SM response, and to pass other MT_Fwd_SM messages on to their respective destinations.

According to a still further aspect of the invention there is provided a telecommunications services apparatus for use with a mobile telecommunications network, the apparatus comprising means to receive a MAP Send Routing Information for Short Message (SRI_SM message) from another network and to forward the said SRI_SM message to an HLR, means to receive the HLR's response to said SRI_SM message, means to modify IMSI information in the SRI_SM response and means to temporarily store information relating to said modified SRI_SM response, and to pass said modified response on to the originating network. The apparatus further comprises means to receive a MAP Mobile Terminated Forward Short Message (MT_Fwd_SM message) from said another network and to correlate this message with stored information relating to a previous sent SRI_SM response. The apparatus is operable to reject MT_Fwd_SM messages for which there is no or inadequate correlation between the MT_Fwd_SM message and a previously sent modified SRI_SM response, and for all other MT_Fwd_SM messages to restore the modified IMSI contained in the MT_Fwd_SM message to its original form, and to pass these MT_Fwd_SM messages on to their respective destinations.

According to a yet further aspect of the invention there is provided a telecommunications services apparatus for use with a mobile telecommunications network, the apparatus comprising means to receive a MAP Send Routing Information for Short Message (SRI_SM message) from another network and to forward the said SRI_SM message to an HLR, means to receive the HLR's response to said SRI_SM message, means to modify IMSI information in the SRI_SM response and to replace the VLR address with the apparatus address in the SRI_SM response and means to temporarily store information relating to said modified SRI_SM response including storing the original VLR address, and to pass said modified response on to the originating network. The apparatus further comprises means to receive a MAP Mobile Terminated Forward Short Message (MT_Fwd_SM message) from said another network and to correlate this message with stored information relating to a previous sent SRI_LSM response. The apparatus is operable to reject MT_Fwd_SM messages for which there is no or inadequate correlation between the MT_Fwd_SM message and a previously sent modified SRI_SM response, and for all other MT_Fwd_SM messages to restore the modified IMSI contained in the MT_Fwd_SM message to its original form, to replace the destination address with the original stored VLR address and to pass these MT_Fwd_SM messages on to their respective destinations.

The invention will now be described by way of example with reference to the accompanying drawings, throughout which like parts are referred to by like references, and in which.

Figure 1:
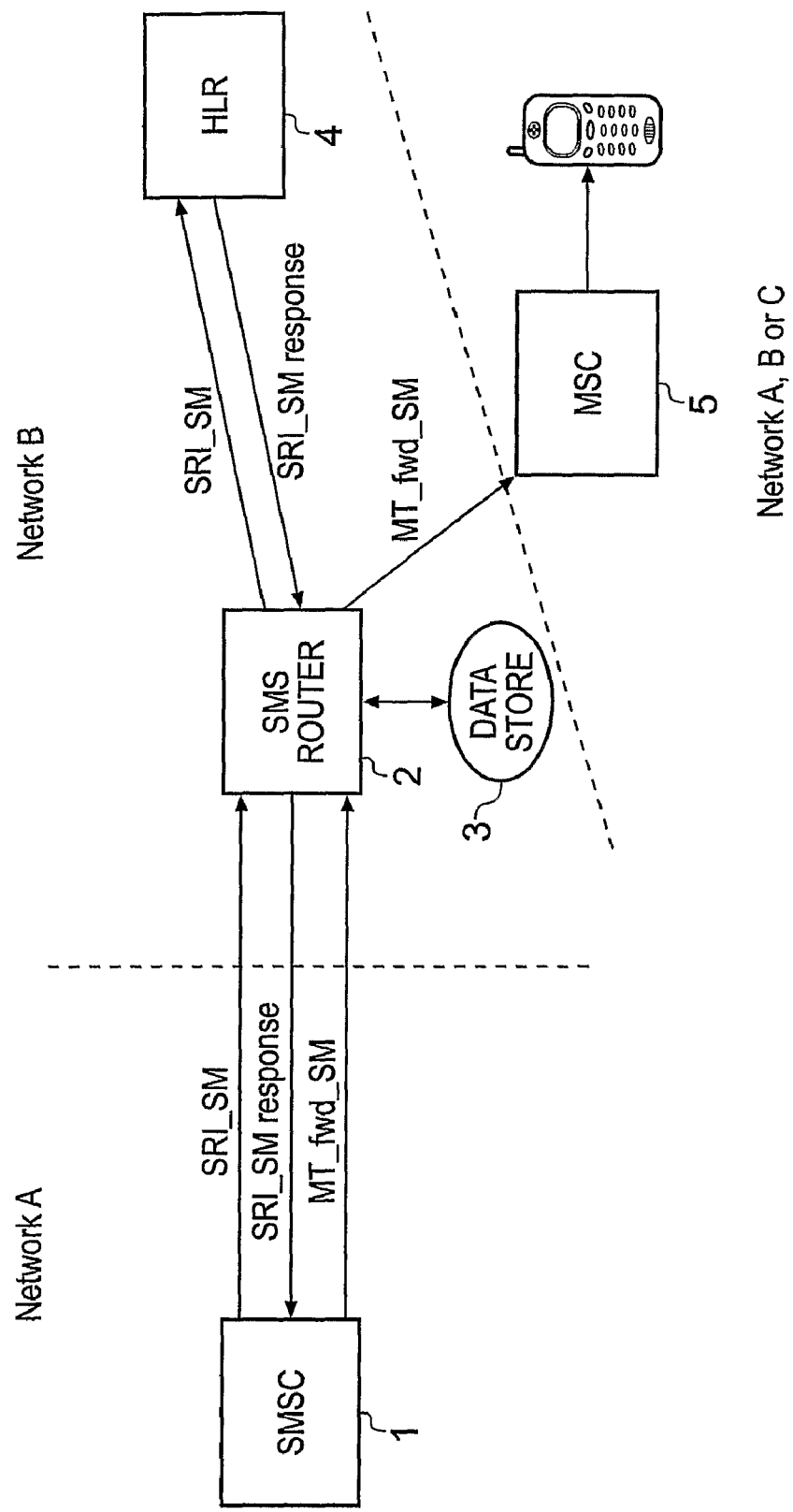
FIG. 1 shows a block diagram of telecommunications services apparatus according to an embodiment of the invention.

Referring to FIG. 1, the apparatus includes an SMSC 1 in a Network A in communication with home location register (HLR) 4 and an MSC NVLR 5 in a Network B, via standard GSM text messaging protocols. It is arranged that certain messages are intercepted by a processing device such as an SMS Router 2 (which may be, for example, one manufactured by Telsis Limited), and which may also be connected to an internal or external data store 3.

Figure 2:
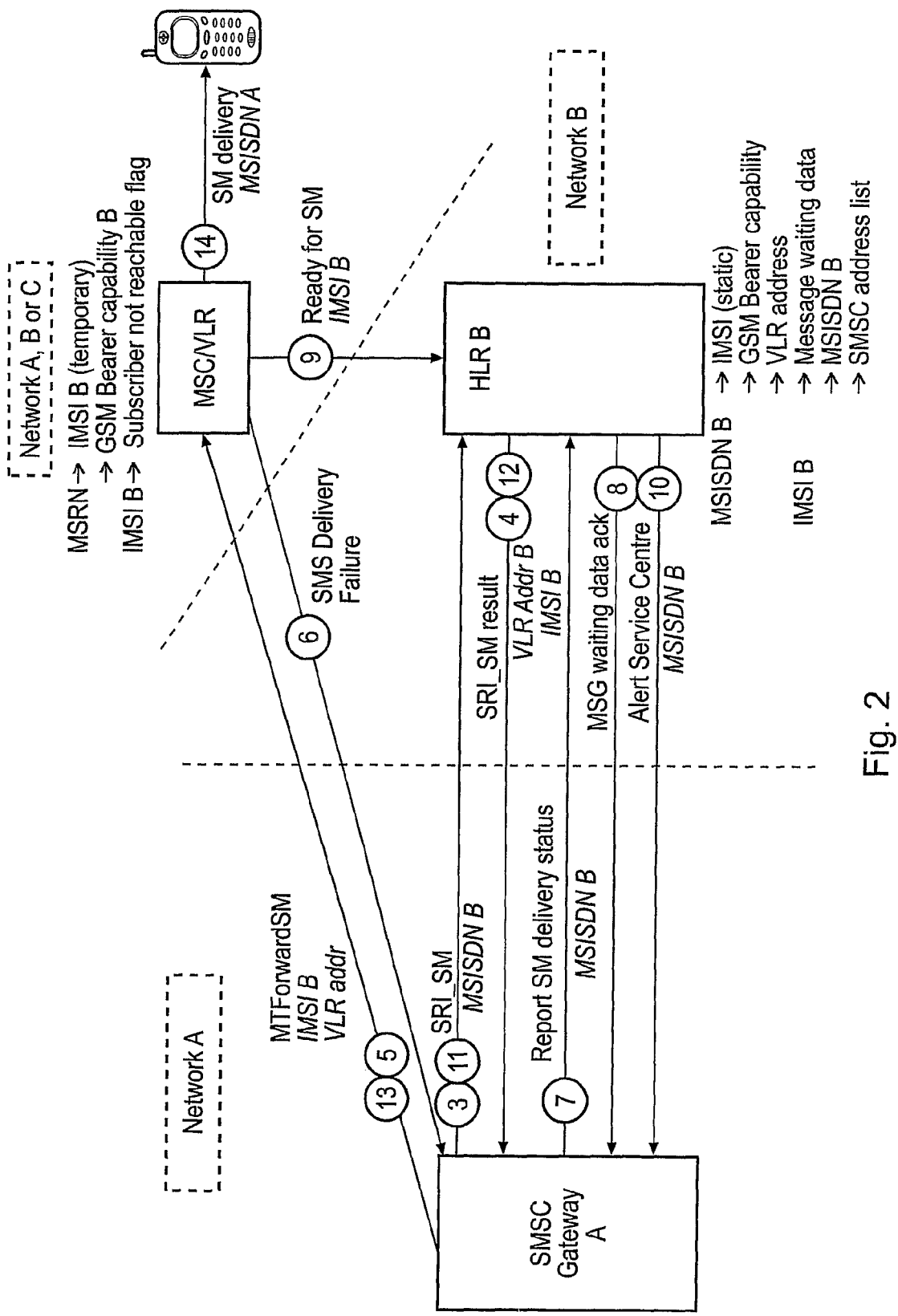
FIG. 2 shows message flows for a general case of message delivery.

It is useful to describe an example of a mobile terminated SMS message to aid understanding of the problem that has to be solved. FIG. 2 shows message flows for a general case of a short message delivery, involving an initial late failure and a subsequent successful retry after the subscriber becomes available again. The numbering on this figure indicates the sequence of messages. The message flows are as indicated:

3. SRI_SM from foreign network SMSC to Home HLR
4. SRI_SM result returned to foreign SMSC, containing VLR address and IMSI.
5. MT_Fwd_SM delivery attempt to MSC/VLR
6. SMS delivery failure indication
7. SMSC reports delivery failure to HLR, causing it to set message waiting data.
8. Acknowledgement to SMSC.
9. Subscriber returns, and MSC/VLR informs HLR
10. HLR alerts SMSC
11. SRI_SM from foreign network SMSC to Home HLR
12. SRI_SM result returned to foreign SMSC, containing VLR address and IMSI.
13. MT_Fwd_SM delivery attempt to MSC/VLR
14. Message forwarded to handset.

If the message delivery succeeds first time at step 5, step 6 becomes a success acknowledgement, and the process jumps to step 14 at this point.

The problem is that an unscrupulous operator may take advantage of this open process to send spam to subscribers, and may modify source address information in any or all of at least messages 3 and 5 to hinder identification of the source. This is called MT faking, as previously described.

Figure 3:
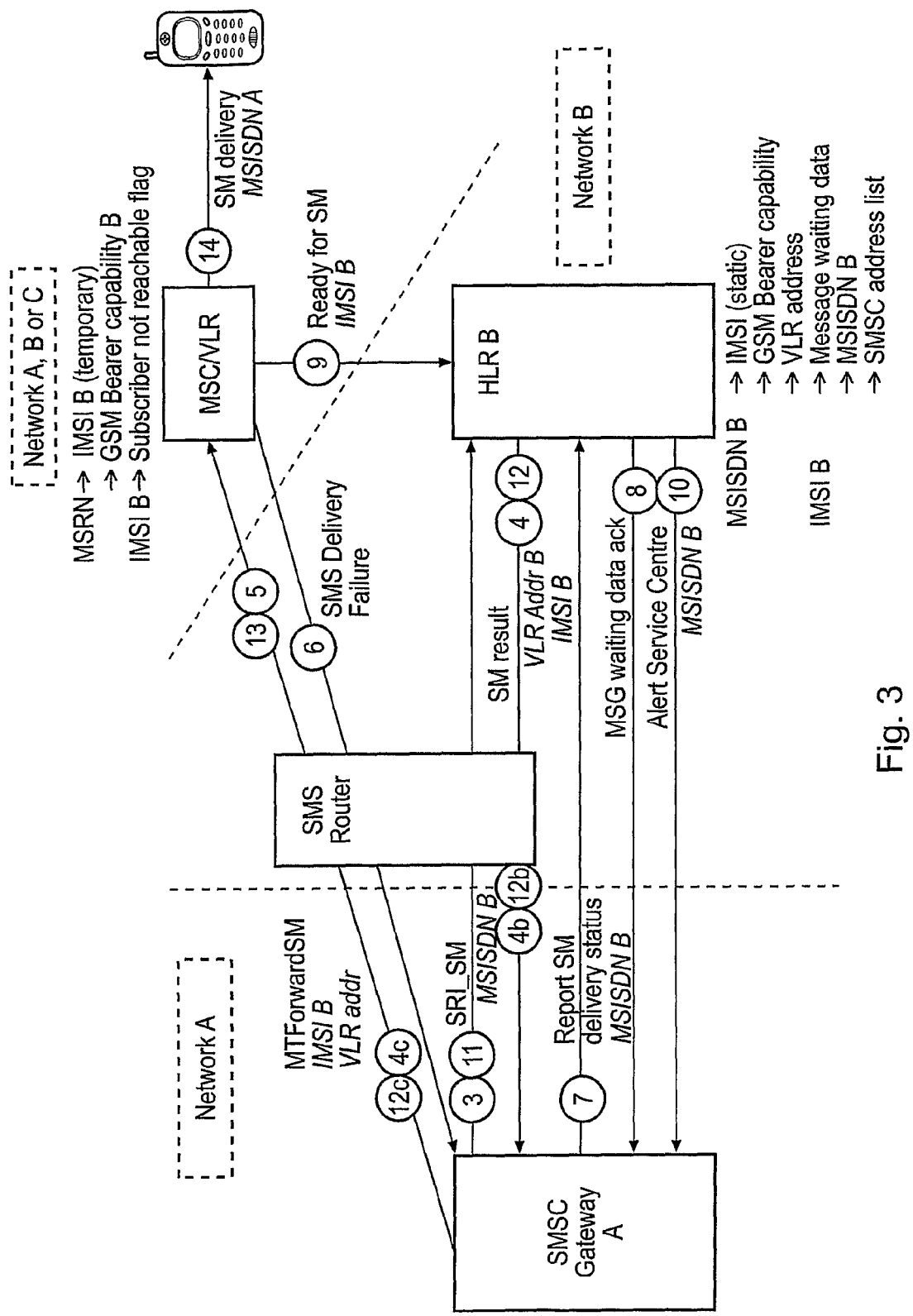
FIG. 3 shows message flows in the apparatus of FIG. 1, in accordance with the embodiment of the invention.

FIG. 3 shows the location of the SMS Router suitable for intercepting the relevant messages and implementing the present technique, thereby preventing the problem of MT faking.

The message flows are as indicated:

3. SRI_SM from foreign network SMSC to Home HLR, intercepted by SMS Router
4. SRI_SM result returned to foreign SMSC via SMS Router, containing VLR address and IMSI.
    4b. SMS Router forwards message to SMSC, but with modified IMSI, and optionally modified VLR address. SMS Router stores information for subsequent validation of MT delivery attempt.
    4c. SMSC attempts MT_Fwd_SM message delivery using modified IMSI, intercepted by SMS Router
5. SMS Router validates that the delivery attempt matches data in its store for a corresponding previous SRS_SM. If so it attempts MT_Fwd_SM delivery to MSC/VLR, using restored IMSI and restored VLR address if modified, otherwise it discards the message.
6. SMS delivery failure indication
7. SMSC reports delivery failure to HLR, causing it to set message waiting data.
8. Acknowledgement to SMSC.
9. Subscriber returns, and MSC/VLR informs HLR
10. HLR alerts SMSC
11. SRI_SM from foreign network SMSC to Home HLR
12. SRI_SM result returned to foreign SMSC via SMS Router, containing VLR address and IMSI.
    12b. SMS Router forwards message to SMSC, but with modified IMSI, and optionally modified VLR address.
    12c. SMSC attempts MT_Fwd_SM message delivery using modified IMSI, intercepted by SMS Router
13. SMS Router attempts MT_Fwd_SM delivery to MSC/VLR, using restored IMSI and restored VLR address if modified
14. Message forwarded to handset.

If the message delivery succeeds first time at step 5, step 6 becomes a success acknowledgement, and the process jumps to step 14 at this point.

Preferred embodiments of the invention modify information in the SRI_SM response by changing the IMSI, and optionally also the VLR address. The IMSI is preferably changed in a randomised manner that is hard for a third party to deduce, and which changes for each message. For example the last N digits of the IMSI could be replaced with a random string of digits. Alternatively, this may be done by appending a short random or cycling sequence of digits to the IMSI or by modifying other parts of the IMSI, or by another method. Many possibilities exist for this aspect of the invention, but preferably the change should not be easy for a fraudulent originator to emulate.

The modified IMSI, or an alternative representation of the modification made, is temporarily stored together with the unmodified IMSI and preferably also the SMSC source address and the destination VLR address before the SRI_SM response is transmitted. Preferably it should be ensured that no two active modified IMSIs should be the same. If a random number technique is used for example, then known pseudo random techniques can ensure that the same random number cannot be in use simultaneously with different IMSIs.

The purpose of changing the IMSI is to ensure correlation between pairs of SRI_SM and subsequent MT_Fwd_SM. The security of the correlation is improved by also comparing the VLR address and the SMSC address. This prevents a Spammer from caching SRI_SM responses, or using previously captured MSISDN/IMSI/VLR data as a destination list for messages. It also ensures that both the SRI_SM and the MT_Fwd_SM come from a genuine source equipment address. If the source address is faked in either or both of the SRI_SM and MT_Fwd_SM, then it is not possible for a correct match to be achieved at the apparatus, and so the message will be rejected. This is the essence of the present technique.

If the VLR address is also changed, then it is changed to point to the global title of the apparatus, and the original VLR address is also stored. The purpose of changing the VLR address is to ensure that MT_Fwd_SM messages arrive at the apparatus, without requiring any special routing or redirection to be undertaken by the network operator, and in this scenario the protection works for all subscribers of the operator even when they are roaming. If the VLR address is not changed in this way, then the technique is restricted to protecting subscribers in their home network; IMSI modification must only be done on messages to subscribers who are currently not roaming, and the operator must arrange to direct these messages via the apparatus by other means.

When an MT_Fwd_SM message arrives at the apparatus, it is matched against stored information (SMSC source address, VLR address and modified IMSI) to determine whether a corresponding entry exists in the store. The modified IMSI information sent in the SRI_SM response must be correctly reflected in the IMSI in the MT_Fwd_SM message. If there is no match to these parameters in the store, then the MT_Fwd_SM message may be deemed to be faked, and may be discarded, with optionally positive, negative or no acknowledgement being sent back to the originating operator.

Once the message has been sent, the store entry is deleted, unless the message was marked with the 'more messages to send flag', in which case the SMSC is indicating that it wishes to send at least one more message using the same SRI_SM request. In this case the stored entry is not deleted and may be reused with a subsequent MT_Fwd_SM message.

The stored data may also preferably be given a lifetime, typically 30 seconds, so that stored SRI_SM data older than this is expired and not usable. This ensures that an SMSC uses the normal procedures for message sending, and ensures that cached or sold IMSI data is useless. The lifetime may be renewed if a message arrives with the 'more messages to send flag' set.

If the modification is correctly present in the IMSI, then the modification is undone, and the MT_Fwd_SM message is passed on to its intended destination. Other types of modification are possible, that still retain the essential principle of requiring the SRI_SM response to be returned to, and used by, the operator that wishes to send an MT_Fwd_SM message.

In summary, operators can force an SMSC to use the standard message sequence, using genuine addresses and without being able to use cached SRI_SM results. It means that perpetrators of Spam will either be automatically blocked by the technique, or if the sender chooses to use his genuine address, messages will be directly attributable to the source operator, allowing normal commercial pressure to be applied to achieve a cessation.

In so far as the embodiment(s) of the invention described above may be implemented, at least in part, using software controlled processing apparatus, it will be appreciated that a computer program providing such software control and a storage medium by which such a computer program is stored are envisaged as aspects of the invention.

The invention claimed is:

1. A telecommunications services apparatus for use with a mobile telecommunications network, the apparatus comprising means for receiving a MAP Send Routing Information for Short Message (SRI_SM message) originating from another network and operable to forward the SRI_SM message to a home location register, means for receiving a response from the home location register to the SRI_SM message, means for temporarily storing information relating to the SRI_SM response and operable to pass said response on to a network address identified as the originating address, means for receiving a MAP Mobile Terminated Forward Short Message (MT_Fwd_SM message) from said another network and operable to correlate the MT_Fwd_SM message with a previously-sent SRI_SM response using stored information, the apparatus being operable to detect and selectively reject MT_Fwd_SM messages for which there is at least insufficient correlation between the MT_Fwd_SM message and the previously-sent SRI_SM response, and to pass other MT_Fwd_SM messages on to their respective destinations.

2. Apparatus according to claim 1, including means for modifying IMSI information in the SRI_SM response.

3. Apparatus according to claim 2, wherein said means for temporarily storing information is operable to store information relating to said modified SRI_SM response and operable to pass said modified response on to the originating address network.

4. Apparatus according to claim 3, wherein the correlation determination is made between the MT_Fwd_SM message and a previously-sent modified SRI_SM response.

5. Apparatus according to claim 2, wherein the IMSI modifying means is operable to replace the visitor location register address in the SRI_SM response, the means for temporarily storing information is operable additionally to store the original visitor location register address, and the destination address is replaced by the stored original visitor location register address before being passed on to the respective destination.

6. A telecommunications services method for use with a mobile telecommunications network, the method comprising receiving a MAP Send Routing Information for Short Message (SRI_SM message) originating from another network and forwarding the SRI_SM message to a home location register, receiving a response from the home location register to the SRI_SM message, temporarily storing information relating to the SRI_SM response and passing said response on to a network address identified as the originating address, receiving a MAP Mobile Terminated Forward Short Message (MT_Fwd_SM message) from said another network and correlating the MT_Fwd_SM message with a previously-sent SRI_SM response using stored information, detecting and selectively rejecting MT_Fwd_SM messages for which there is at least insufficient correlation between the MT_Fwd_SM message and the previously-sent SRI_SM response, and passing other MT_Fwd_SM messages on to their respective destinations.

7. A method according to claim 1, including modifying IMSI information in the SRI_SM response.

8. A method according to claim 7, wherein said step of temporarily storing information is operable to store information relating to said modified SRI_SM response and operable to pass said modified response on to the originating address network.

9. A method according to claim 8, wherein the correlation determination is made between the MT_Fwd_SM message and a previously-sent modified SRI_SM response.

10. A method according to claim 7, wherein the IMSI modifying step is operable to replace the visitor location register address in the SRI_SM response, the step of temporarily storing information is operable additionally to store the original visitor location register address, and the destination address is replaced by the stored original visitor location register address before being passed on to the respective destination.

11. A computer program product comprising a non-transitory computer-readable storage medium having computer-executable instructions stored thereon for implementing a telecommunications services method for use with a mobile telecommunications network, the method comprising, receiving a MAP Send Routing Information for Short Message (SRI SM message) originating from another network and forwarding the SRI SM message to a home location register, receiving a response from the home location register to the SRI_SM message, temporarily storing information relating to the SRI_SM response and passing said response on to a network address identified as the originating address, receiving a MAP Mobile Terminated Forward Short Message (MT Fwd SM message) from said another network and correlating the MT Fwd SM message with a previously-sent SRI SM response using stored information, detecting and selectively rejecting MT_Fwd_SM messages for which there is at least insufficient correlation between the MT Fwd SM message and the previously-sent SRI SM response, and passing other MT Fwd SM messages on to their respective destinations.

12. Apparatus according to claim 3, wherein the IMSI modifying means is operable to replace the visitor location register address in the SRI_SM response, the means for temporarily storing information is operable additionally to store the original visitor location register address, and the destination address is replaced by the stored original visitor location register address before being passed on to the respective destination.

13. Apparatus according to claim 4, wherein the IMSI modifying means is operable to replace the visitor location register address in the SRI_SM response, the means for temporarily storing information is operable additionally to store the original visitor location register address, and the destination address is replaced by the stored original visitor location register address before being passed on to the respective destination.

14. A method according to claim 8, wherein the IMSI modifying step is operable to replace the visitor location register address in the SRI_SM response, the step of temporarily storing information is operable additionally to store the original visitor location register address, and the destination address is replaced by the stored original visitor location register address before being passed on to the respective destination.

15. A method according to claim 9, wherein the IMSI modifying step is operable to replace the visitor location register address in the SRI_SM response, the step of temporarily storing information is operable additionally to store the original visitor location register address, and the destination address is replaced by the stored original visitor location register address before being passed on to the respective destination.

16. A computer program product comprising a computer-readable storage medium having computer-executable instructions stored thereon for implementing the method of claim 7.

17. A computer program product comprising a computer-readable storage medium having computer-executable instructions stored thereon for implementing the method of claim 8.

18. A computer program product comprising a computer-readable storage medium having computer-executable instructions stored thereon for implementing the method of claim 9.

19. A computer program product comprising a computer-readable storage medium having computer-executable instructions stored thereon for implementing the method of claim 10.

20. A computer program product comprising a computer-readable storage medium having computer-executable instructions stored thereon for implementing the method of claim 14.

* * * * *